July 4, 1944.  F. W. MEREDITH  2,352,878
AIRCRAFT AIR SPEED CONTROL
Filed June 13, 1939
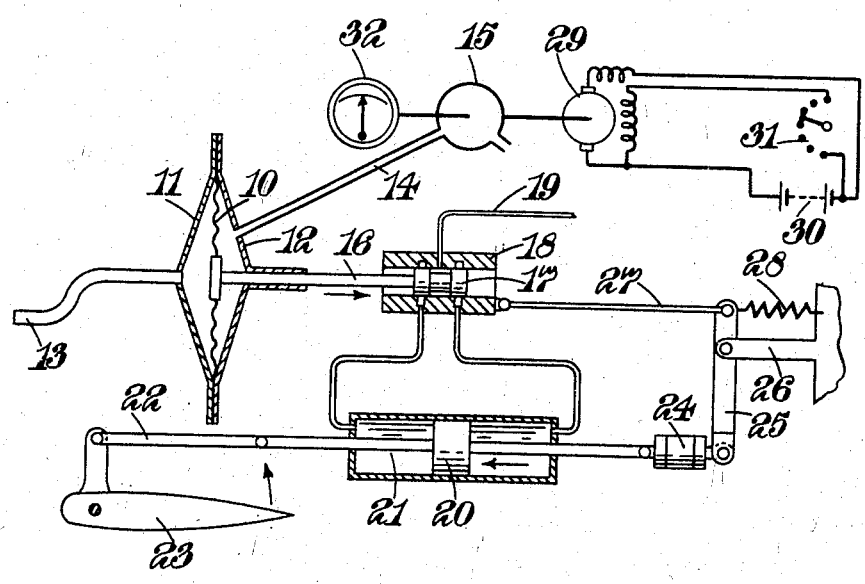
Frederick W. Meredith
By
\_\_\_, Cole, Grindle & Watson
ATTYS.

Patented July 4, 1944

2,352,878

UNITED STATES PATENT OFFICE 2,352,878

AIRCRAFT AIR SPEED CONTROL

Frederick William Meredith, London, England, assignor to S. Smith & Sons (Motor Accessories) Limited, London, England, a British company Application June 13, 1939, Serial No. 278,940
In Great Britain June 14, 1938

6 Claims. (Cl. 244—78)

This invention relates to the control of aircraft according to air speed. The invention is concerned with apparatus of the known kind for adjusting a control surface of an aircraft, such as an elevator, comprising a movable control member which is subjected to a dynamic pressure produced by the air, means for applying an opposing biasing force to the control member and means operated by the control member automatically to adjust the control surface of the aircraft such as to maintain a constant air speed.

It is known to control the elevators of an aircraft automatically in accordance with the indicated air speed (i. e. $R^{\frac{1}{2}} V$ where V is the true air speed and R is the relative density $$\frac{\rho}{\rho_0}$$

where $\rho$ is the actual density of the air and $\rho_0$ is the conventional air density at ground level) to maintain the speed constant by varying the adjustment of the elevators according to the difference between a dynamic pressure produced by the air, due to the motion of the aircraft, and a biasing force consisting of a spring which may be adjustable. The term "dynamic pressure" is herein used to indicate the pressure due to motion (i. e. $k\rho V^2$ where $\rho$ is the air density, V the velocity of motion and $k$ a constant depending on the type of exploration head employed).

According to the present invention there is provided an apparatus of the kind referred to for controlling aircraft wherein the opposing biasing force is applied to the control member by means of fluid pressure. For producing the fluid pressure there is conveniently provided a pump, of which the output pressure increases with an increase of fluid density, so that by employing air as the fluid the pressure may be made proportional to the air density. The control will then be independent of the actual density of the aid and therefore in accordance with true air speed. Means is preferably provided for varying the speed of the pump to vary the speed of the aircraft This pump outlet pressure may be designated the "datum" pressure and will be understood to include the prevailing static pressure as well as the dynamic pressure due to the action of the pump.

According to a further feature of the invention a tachometer is coupled to the pump for providing an indication of true air speed, and the tachometer scale is conveniently calibrated accordingly. The indication of true air speed is obtained when the dynamic pressure balances the pump pressure.

In a preferred construction the control member comprises a flexible diaphragm forming at one side the wall of a chamber connected to a Pitot tube and at the other side a wall of a chamber connected to a source of opposing fluid pressure.

One specific embodiment of the invention is illustrated diagrammatically and by way of example in the accompanying drawing.

Referring to the drawing, the control member is constituted by a flexible diaphragm 10 mounted in a housing consisting of rigid walls 11 and 12 at opposite sides of the diaphragm. The chamber formed by the diaphragm and the wall 11 communicates with a Pitot head 13, and the chamber formed by the diaphragm and the wall 12 communicates by a pipe 14 with a centrifugal air pump 15.

The diaphragm 10 is connected to a spindle 16 extending through the wall 12 of the housing for operation of the elevator of an aircraft through a pneumatic servomotor in known manner. The spindle 16 is connected to a piston valve 17 movable in a cylinder 18 for controlling the supply of compressed air through a pipe 19 to opposite sides of a piston 20 of a servomotor 21. The piston is connected by a linkage 22 to the elevator indicated at 23. To provide the necessary follow-up, the piston is also connected to one arm of a lever 25 pivoted on a fixed bracket 26, the other arm of the lever being connected by a link 27 to the cylinder 18. Known centering mechanism comprising a viscous element 24 and a spring 28 is provided for the purpose of re-centering the valve casing 18 and hence the diaphragm 10 when the trimming position of the elevator is varied.

The pump is driven for example by an electric motor 29 from a battery 30, the speed of the motor being adjustable by means of a rheostat 31. The pump is also connected to a tachometer 32 which is calibrated for air speed.

In operation, the air pressure provided by the pump 15 is applied to the diaphragm 10 in opposition to the dynamic pressure at the Pitot head 13 due to the motion of the aircraft. When the pump 15 is run at constant speed, movements of the diaphragm will only result from changes of true air speed because its movement is independent of the actual density of the air and will therefore control the elevator 23 through the servomotor 21 according to true air speed, so as to maintain the speed of the aircraft substantially constant. The tachometer 32 provides, under steady conditions, an indication of true air speed. To vary the true air speed it is only necessary to vary the speed of the pump 15 until the desired air speed is indicated on the tachometer 32. If the pressure produced by the pump 15 is not of the same order as the dynamic pressure, the diaphragm 10 may be replaced by two interconnected diaphragms, static pressure being applied to the space between the diaphragms.

In a further modification a constant torque may be applied to the pump 15, for instance by including a constant current device in the motor circuit, and the aircraft will then be controlled by the flexible diaphragm in accordance with the indicated air speed instead of true air speed, although the tachometer will still indicate the true air speed.

It will be understood that the invention is not restricted to the specific embodiments hereinbefore described; for instance, means other than a pump may be employed for adjusting the fluid pressure applied to the control member.

I claim:

1. Apparatus for adjusting a control device for regulating the speed of an aircraft comprising a movable control member operatively connected with said control device, means operatively communicating with said control member to apply thereto a pressure in one direction which is the algebraic sum of the prevailing static pressure and a pressure proportional to the dynamic pressure of the air due to the motion of said aircraft therethrough, a constant speed motor, an air pump driven by said motor, the outlet pressure of said pump increasing with an increase in air density, and means connecting the outlet of the pump with said control member for applying to the latter an opposed biassing pressure determined by the speed of said pump and air density.

2. Apparatus for adjusting an aircraft control device to regulate the speed of said aircraft, comprising a movable control member operatively connected with said control device, means operatively communicating with said control member to apply thereto a pressure in one direction which is the algebraic sum of the prevailing static pressure and a pressure proportional to the dynamic pressure of the air due to the motion of said aircraft therethrough, a constant speed motor, means for adjusting said motor at will to run at selected constant speeds, an air pump driven by said motor, the outlet pressure of said pump increasing with an increase in air density, and means connecting the outlet of the pump with said control member for applying to the latter an opposed biassing pressure determined by the selected speed of said pump and air density.

3. In an aircraft having a control device for adjusting the speed thereof; apparatus for adjusting said control device comprising a movable control member operatively connected with said control device, means operatively communicating with said control member to apply thereto a pressure in one direction which is the algebraic sum of the prevailing static pressure and a pressure proportional to the dynamic pressure of the air due to the motion of said aircraft therethrough, a constant speed motor, an air pump driven by said motor, the outlet pressure of said pump increasing with an increase in air density, and means connecting the outlet of the pump with said control member for applying to the latter an opposed biassing pressure determined by the speed of said pump and air density.

4. In an air speed responsive device for automatically controlling the operation of an aircraft, the combination including an expansible container subject to air pressure variable with air speed, a second expansible container subject to a datum air pressure, said containers being so juxtaposed that the expansion of each is opposed by the expansion of the other, a servomotor for controlling the operation of the craft, controlling means responsive to displacement of the juxtaposed walls of said containers for operating said motor, and means adjustable at will for altering the datum air pressure in said second container.

5. In an air speed responsive device for automatically controlling the air speed of an aircraft, the combination including an expansible container subject to air pressure variable with air speed, a second expansible container subject to a datum air pressure varying with altitude in the same manner as said air-speed-variable air pressure, a constant speed air pump communicating with said second container to supply said datum air pressure, said containers being so juxtaposed that the expansion of each is opposed only by the expansion of the other, a servomotor for controlling the air speed of the craft, and controlling means responsive to displacement of the juxtaposed walls of said containers for operating said servo-motor whereby said device is rendered independent of changes of altitude.

6. In an air speed responsive device for automatically controlling the air speed of an aircraft, the combination including an expansible container subject to air pressure variable with air speed, a second expansible container subject to a datum air pressure varying with altitude in the same manner as said air-speed-variable air pressure, a constant speed air pump communicating with said second container to supply said datum air pressure, said containers being so juxtaposed that the expansion of each is opposed only by the expansion of the other, a servomotor for controlling the air speed of the craft, controlling means responsive to displacement of the juxtaposed walls of said containers for operating said servomotor and means for adjusting the speed of said constant speed air pump at will.

FREDERICK WILLIAM MEREDITH.